United States Patent
Frankie et al.

[15] 3,685,716
[45] Aug. 22, 1972

[54] RIVET CENTER DETECTOR MECHANISM EMBODYING STRAIN GAUGE

[72] Inventors: Thomas T. Frankie, Chula Vista; Larry B. Pascoe, National City, both of Calif.

[73] Assignee: Rohr Corporation, Chula Vista, Calif.

[22] Filed: April 29, 1971

[21] Appl. No.: 138,432

[52] U.S. Cl. .......................... 227/1, 227/51, 227/149
[51] Int. Cl. ............................................. B21j 15/28
[58] Field of Search ..................... 227/1, 2, 3, 51, 149

[56] References Cited

UNITED STATES PATENTS

| | | | |
|---|---|---|---|
| 2,758,303 | 8/1956 | Dow et al. | 227/1 |
| 2,904,786 | 9/1959 | Hazel et al. | 227/2 |
| 3,279,671 | 10/1966 | Bachman, Jr. et al. | 227/1 |

*Primary Examiner*—Granville Y. Custer, Jr.
*Attorney*—George E. Pearson

[57] ABSTRACT

To determine whether or not a rivet has been delivered to, and is properly centered between a pair of complementary recesses provided in the fingers of an automatic riveting machine, a pair of strain gauges are operatively associated with the rivet holding fingers, the strain gauges being incorporated in opposite sides of a balanced, bridged circuit which is connected to actuate, selectively, a plurality of detectors, each detector, when actuated, indicating a relative separated condition of the rivet holding fingers.

7 Claims, 7 Drawing Figures

PATENTED AUG 22 1972　　　　　　　　　　　　　　　3,685,716
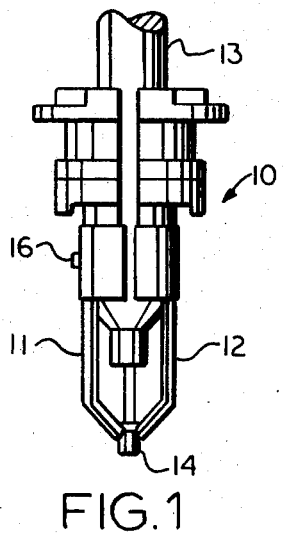
FIG. 1
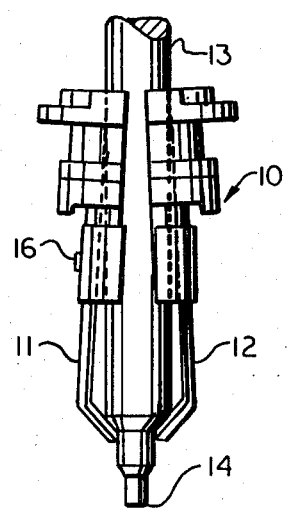
FIG. 2
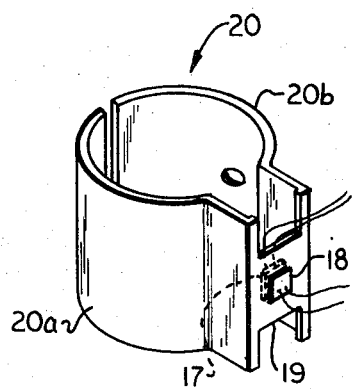
FIG. 3
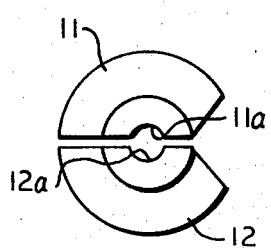
FIG. 4
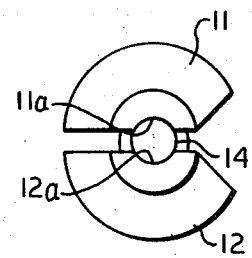
FIG. 5
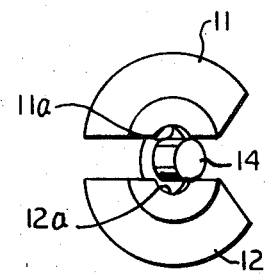
FIG. 6
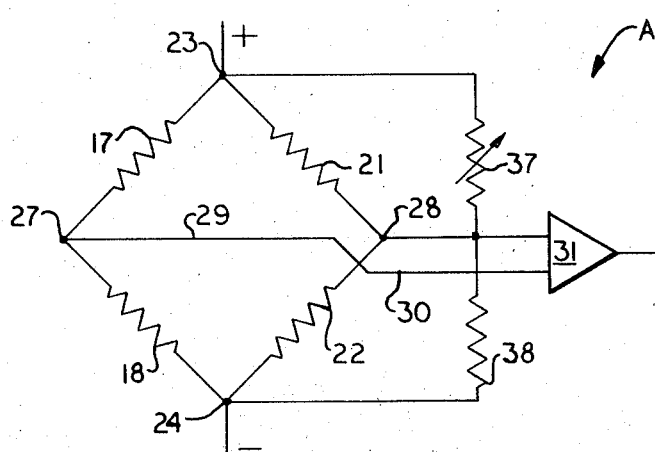
FIG. 7
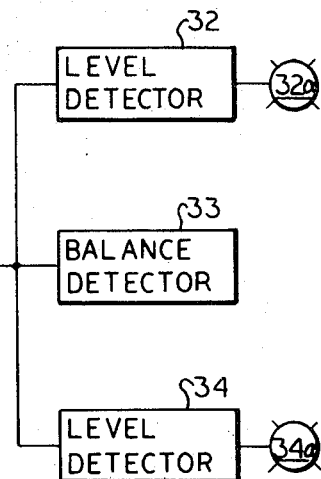
INVENTOR.
THOMAS T. FRANKIE
LARRY B. PASCOE
BY　*George E. Pearson*
　　　　　　ATTORNEY

RIVET CENTER DETECTOR MECHANISM EMBODYING STRAIN GAUGE

BACKGROUND OF THE INVENTION

So far as is known, detection of a missing or improperly placed rivet between the rivet holding fingers of an automatic riveting machine is the responsibility of the human operator, and no automatic detection mechanism for this purpose is at present available.

SUMMARY OF THE INVENTION

A primary objective of the present invention is to provide the rivet holding fingers of an automatic riveting machine with at least one strain gauge which is connected into a bridged circuit, so arranged that when the rivet holding fingers are empty, and therefore in their inward limit of movement, the circuit will be unbalanced in one direction to indicate a first "no go" situation; when the fingers are displaced slightly outwardly by the presence of a rivet in properly centered position therebetween the circuit will be balanced to indicate a "go" condition; and when the fingers are displaced outwardly still further by the presence of a rivet in cocked or improperly centered position therebetween, the circuit will be unbalanced in the opposite direction to indicate a second "no go" condition. The invention may be used either to operate appropriate signals, or to control subsequent operation of a machine in which it is embodied.

BRIEF DESCRIPTION OF THE DRAWINGS

The foregoing objectives and advantages of the invention will be apparent from the following description and the accompanying drawing, wherein:

FIGS. 1 and 2 are fragmentary, side elevational view of the rivet setting head of an automatic riveting machine, FIG. 1 showing a rivet in properly centered position between the rivet holding fingers and the setting plunger retracted, and FIG. 2 showing the plunger advanced.

FIG. 3 3 is an enlarged, perspective view showing a spring band which encircles the rivet holding fingers and biases them inwardly toward each other, the strain gauges being shown mounted on the transverse connecting portion of the band.

FIG. 4 is an enlarged bottom view as of FIG. 1, but with the rivet holding fingers empty.

FIG. 5 is a view similar to FIG. 4, but with a rivet gripped in properly centered position between the fingers as in FIG. 1.

FIG. 6 is a view similar to FIGS. 4 and 5 but with a rivet gripped in cocked, non-centered position between the fingers.

FIG. 7 is a schematic, bridged circuit diagram embodying a pair of the strain gauges operatively associated with the rivet holding fingers.

DETAILED DESCRIPTION OF THE DRAWINGS

Referring to the drawings in detail, a well known type of automatic rivet setting machine, not shown, marketed under the trade mark DRIVMATIC, has a setting head 10 comprising a pair of rivet holding fingers 11 and 12 and a reciprocally driven setting plunger 13. The fingers 11 and 12 have complementary, cylindrically curved recesses 11a and 12a respectively therein of a size to receive and seat a rivet 14 of known diameter coaxially therebetween.

As is well known to those familiar with such mechanisms, the setting head 10 is actuated to travel back and forth along a path in the plane of the paper upon which FIGS. 1 and 2 are printed, i.e. up and down, between a first position at one end of such path where a rivet 14 is fed into position between the fingers 11 and 12, and a second position at the other end of such path where the rivet, if properly centered between the fingers, is forced into a pre-positioned rivet hole in a workpiece, not shown, and set by a downward stroke of the setting plunger 13 against the usual anvil, not shown, of the riveting machine.

To insure that the rivet setting procedure will be aborted in the event that (1) the fingers 11 and 12 are empty, or (2) a rivet is not properly centered between the fingers, a pair of conventional strain gauges 17 and 18 are mounted on opposite sides of the connecting band portion 19 of a conventional spring clip 20 which encloses the fingers 11 and 12 and urges them toward each other. A screw 16 passes through a hole provided in the clip 20 and is screwed into a threaded hole provided in one of the fingers to anchor the band in position.

The illustrated strain gauges 17 and 18 may be of the type known commercially as PREMMCO No. EA-031EC-120, in which any elongation of the strain gauge increases resistance therethrough, and vice versa. However, the specific type of strain gauges employed, and the manner of their connection to the rivet holding fingers are not features of the present invention and may be varied as required by one designing a specific embodiment of the invention. As illustrated, separation of the fingers 11 and 12 separates the two arcuate portions 20a and 20b of the clip 20, thereby arching the clip connecting band portion 19 to lengthen the inner strain gauge 17 and thus increase its resistance, and to shorten the outer strain gauge 18 and thus decrease its resistance.

The strain gauges 17 and 18 are embodied in a bridged circuit A, see FIG. 7. The circuit A is simple, and since the principal parts thereof are conventional, and are labeled, its structure will be apparent to one familiar with strain gauge circuitry from the following description of the operation of the invention.

OPERATION

With the strain gauges 17 and 18 connected into opposite sides of the bridged circuit A as shown in FIG. 7, and a pair of fixed resistors 21 and 22 of equal resistance also connected into opposite sides of the circuit, and an electric battery or other suitable source of direct current connected to the circuit A at terminals 23 and 24 as shown, the mid-point terminals 27 and 28 of the bridged circuit A are connected by conductors 29 and 30, respectively, through a null potential differential amplifier 31 to three detectors 32, 33 and 34.

The circuit A is adjusted in a well known manner to a desired null condition by means of a variable resistor 37, and a fixed resistor 38, preferably so as to produce zero potential between the terminals 27 and 28 when the rivet holding fingers 11 and 12 are in their slightly separated, "rivet centered" condition shown in FIGS. 1 and 5.

In the event that, through exhaustion of the supply of rivets or a malfunction of the rivet feeding mechanism, the fingers 11 and 12 are empty, and therefore in their inward limit of movement as shown in FIG. 4, the clip portion 19 is arched to extend the outer strain gauge 18 to increase its resistance and the inner strain gauge 17 to shorten the the inner strain gauge 17 to decrease its resistance. The circuit A is thereby unbalanced, and produces a positive potential across the terminals 27 and 28.

In the event that a rivet 14 is fed to the fingers 11 and 12 and is not properly centered therebetween, for example, being in cocked position as shown in FIG. 6, the fingers 11 and 12 are thereby separated farther than in FIGS. 1 and 5. Such added separation arches the clip portion 19 beyond its adjusted null position and thereby extends the inner strain gauge 17 to increase its resistance, at the same time contracting the outer strain gauge 18 to decrease its resistance, thereby unbalancing the circuit A and producing a negative potential across the terminals 27 and 28.

The detector 32 is responsive to a positive potential across the terminals 27 and 28, caused by the fingers 11 and 12 being empty; the detector 33 is responsive to a zero potential, caused by the presence of a rivet in properly centered position between the fingers; and the detector 34 is responsive to a negative potential across the terminals 27 and 28 caused by the presence of a cocked or improperly centered rivet between the fingers.

The detector 32 is shown as actuating a first signal light 32a, while the detector 34 is shown as actuating a second signal light 34a. Instead of signal lights, the current to these malfunction detectors can, if desired, be used in a well known manner to actuate relays, not shown, controlling the operation of mechanism, not shown, for clearing such malfunction, or for stopping the riveting machine until an operator clears the indicated malfunction.

The invention provides a simple, positive and relatively inexpensive mechanism for monitoring and controlling an automatic rivet setting machine.

Having thus described my invention, what I claim as new and useful and desire to secure by U.S. Letters Patent is:

1. A rivet center detector for an automatic riveting machine having a pair of rivet holding fingers with complementary recesses therein for receiving a rivet of known size in centered, seated relation in said recesses, and means biasing the fingers toward each other to rivet holding position, said detector comprising;

at least one strain gauge operatively associated with at least one of the fingers in a manner to vary the electrical resistance of said at least one strain gauge in one direction upon moving said at least one finger in a direction to increase the separation between the fingers, and to vary the resistance of said at least one strain gauge in the opposite direction upon moving said at least one finger in the opposite direction to thereby decrease the separation between the fingers, a bridged circuit incorporating said at least one strain gauge, and detector means responsive to each of a selected plurality of unbalanced conditions of the bridged circuit caused by such variations in the resistance of said at least one strain gauge.

2. A rivet center detector as claimed in claim 1 wherein two strain gauges are operatively associated one with each of the fingers, and said strain gauges are incorporated in the bridged circuit so that their unbalancing effect thereon is cumulative.

3. A rivet center detector as claimed in claim 2 wherein the strain gauges are so located relative to the fingers that a change in separation of the fingers resulting in a decrease of the resistance of one of the strain gauges results in an increase of the resistance of the other strain gauge.

4. A rivet center detector as claimed in claim 1 wherein spring means biases the fingers toward each other, said spring means having a portion thereof which is bent in one direction by an increase in separation between the fingers, and is bent in the opposite direction by a decrease in such separation, and said at least one strain gauge is mounted on such spring portion for selective increase and decrease in the resistance of said at least one strain gauge upon bending such portion selectively in each of two opposite directions.

5. A rivet center detector as claimed in claim 4 wherein a strain gauge is mounted one on each of two opposite sides of said spring means portion and the strain gauges are so incorporated in the bridged circuit that their unbalancing effect thereon is cumulative.

6. A rivet center detector as claimed in claim 4 wherein the spring means is an enclosing band of spring metal.

7. A rivet center detector as claimed in claim 5 wherein the spring means is an enclosing, generally C shape band of spring sheet metal and the strain gauges are mounted one inside and the other outside of the band and substantially medially between the ends thereof.

* * * * *